(12) United States Patent
Wardlaw et al.

(10) Patent No.: US 12,533,211 B1
(45) Date of Patent: Jan. 27, 2026

(54) RUGGEDIZED BLUETOOTH® LOW ENERGY TRACKING

(71) Applicant: Matthew Thomas Provencher, Vail, CO (US)

(72) Inventors: Matthew Allen Wardlaw, Edwards, CO (US); Matthew Thomas Provencher, Edwards, CO (US)

(*) Notice: Subject to any disclaimer, the term of this patent is extended or adjusted under 35 U.S.C. 154(b) by 388 days.

(21) Appl. No.: 18/085,912

(22) Filed: Dec. 21, 2022

Related U.S. Application Data

(60) Provisional application No. 63/292,061, filed on Dec. 21, 2021.

(51) Int. Cl.
*A61B 90/98* (2016.01)
*H04W 64/00* (2009.01)

(52) U.S. Cl.
CPC .......... *A61B 90/98* (2016.02); *H04W 64/003* (2013.01)

(58) Field of Classification Search
CPC ........ A61B 90/98; A61B 34/30; A61B 34/10; A61B 50/30; A61B 2034/252; A61B 2034/256; A61B 34/25; A61B 90/96; A61B 2034/105; A61B 2034/104; A61B 2034/108; A61B 2034/305; A61B 2090/374; A61B 2090/376; A61B 2090/3937; A61B 34/20; A61B 34/32; A61B 34/35; A61B 34/37; A61B 90/361; A61B 2034/2055; A61B 2034/254; A61B 2050/375; A61B 2090/0804; A61B 2090/306; A61B 2090/309; A61B 2090/3614; A61B 2090/378; A61B 34/70; A61B 5/01; A61B 5/021; A61B 5/024; A61B 5/0816; A61B 5/24; A61B 5/318; A61B 5/369; A61B 5/389; A61B 50/33; A61B 90/08; A61B 90/20; A61B 2017/00203; A61B 2017/00216; A61B 2034/101; A61B 2034/107; A61B 2090/365; A61B 90/37; H04W 64/003; G16H 20/40; G16H 40/20; G16H 40/63;
(Continued)

(56) References Cited

U.S. PATENT DOCUMENTS

| | | | |
|---|---|---|---|
| 2014/0135042 A1* | 5/2014 | Buchheim | G01S 1/725 455/566 |
| 2015/0305786 A1* | 10/2015 | Wehrle | A61B 90/98 606/86 A |
| 2023/0306614 A1* | 9/2023 | Mohr | G06T 7/0012 |

* cited by examiner

*Primary Examiner* — Carl H Layno
*Assistant Examiner* — Anh-Khoa N Dinh
(74) *Attorney, Agent, or Firm* — FisherBroyles, LLP; Greogry T. Fettig

(57) ABSTRACT

Systems and methods herein provide for tracking surgical instrument kits. One system includes a surgical instrument kit operable to retain a plurality of surgical instruments for sterilization in an autoclave, a Bluetooth® low energy (BTLE) device operable to transmit a signal for locating and identifying the surgical instrument kit, a battery operable to provide power to the BTLE device, and a housing operable to retain the BTLE device and the battery and to withstand temperatures in excess of 250 degrees Fahrenheit. Then, a handheld computing device can detect the signal from the BTLE device and determine a geolocation and an identification of the BTLE device for transmission to a secure network. The system also includes a computing system that processes the geolocation and the identification of the BTLE device and alerts a user responsible for the surgical instrument kit.

2 Claims, 4 Drawing Sheets

(58) Field of Classification Search
CPC ........ G16H 40/40; G16H 40/67; G16H 10/60; G16H 50/70
See application file for complete search history.

RUGGEDIZED BLUETOOTH® LOW ENERGY TRACKING

CROSS REFERENCE TO RELATED APPLICATIONS

This patent application claims priority to, and thus the benefit of an earlier filing date from, U.S. Provisional Patent Application No. 63/292,061 (filed Dec. 21, 2021), the contents of which are hereby incorporated by reference.

BACKGROUND

Surgical instrument kits are exceptionally expensive, and millions of dollars are lost each year by hospitals and surgery centers around the world through the misplacement of these kits. These losses are compounded when medical device companies provide loaner instrument kits for a fee. Tracking these instrument kits is often done by hand and therefore prone to human error. Some more elaborate techniques, such as the use of radiofrequency identification (RFID) tags, have been implemented to track instrument kits, but these techniques are often cumbersome and expensive, and typically require hardware installation over doors and other areas of a facility. Tracking surgical instrument kits in an efficient and timely manner will save millions of dollars per year in inventory costs.

SUMMARY

Systems and methods herein provide for tracking surgical instrument kits. In one embodiment, a system includes a surgical instrument kit operable to retain a plurality of surgical instruments for sterilization in an autoclave, a Bluetooth® low energy (BTLE) device, operable to transmit a signal for locating and identifying the surgical instrument kit, a battery operable to provide power to the BTLE device, and a housing operable to retain the BTLE device and the battery. As used herein, a Bluetooth® Low Energy (BTLE) device refers to a wireless low-energy transfer (WLET) device. The housing includes a first part and a second part, each being configured from a plastic that is operable to withstand temperatures in excess of 250 degrees Fahrenheit. The first part of the housing includes a recessed area in which the BTLE device is positioned. The second part of the housing is operable to mate with the first part of the housing via a compression means that seals the BTLE device within the housing and waterproofs the BTLE device. The housing also includes a fastening means for securing to the surgical instrument kit. In one embodiment, the second part of the housing comprises a threaded receiver for receiving a gantry pull mechanism to allow the second part of the housing to be separated from the first part of the housing when the battery requires replacement. The system also includes a handheld computing device operable to detect the signal from the BTLE device when the handheld computing device is within a predetermined proximity of the surgical instrument kit, to determine a geolocation and an identification of the BTLE device, and to transmit the geolocation and the identification of the BTLE device to a secure network. The system also includes a computing system communicatively coupled to the secure network and operable to process the geolocation and the identification of the BTLE device, to identify a user responsible for the surgical instrument kit based on the processed identification of the BTLE device, and to alert the user of the geolocation of the surgical instrument kit based on the processed geolocation of the BTLE device.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles and are included within the scope of the embodiments. Furthermore, any examples described herein are intended to aid in understanding the embodiments and are to be construed as being without limitation to such specifically recited examples and conditions. As a result, the embodiments are not limited to any of the examples described below.

Figure 1:
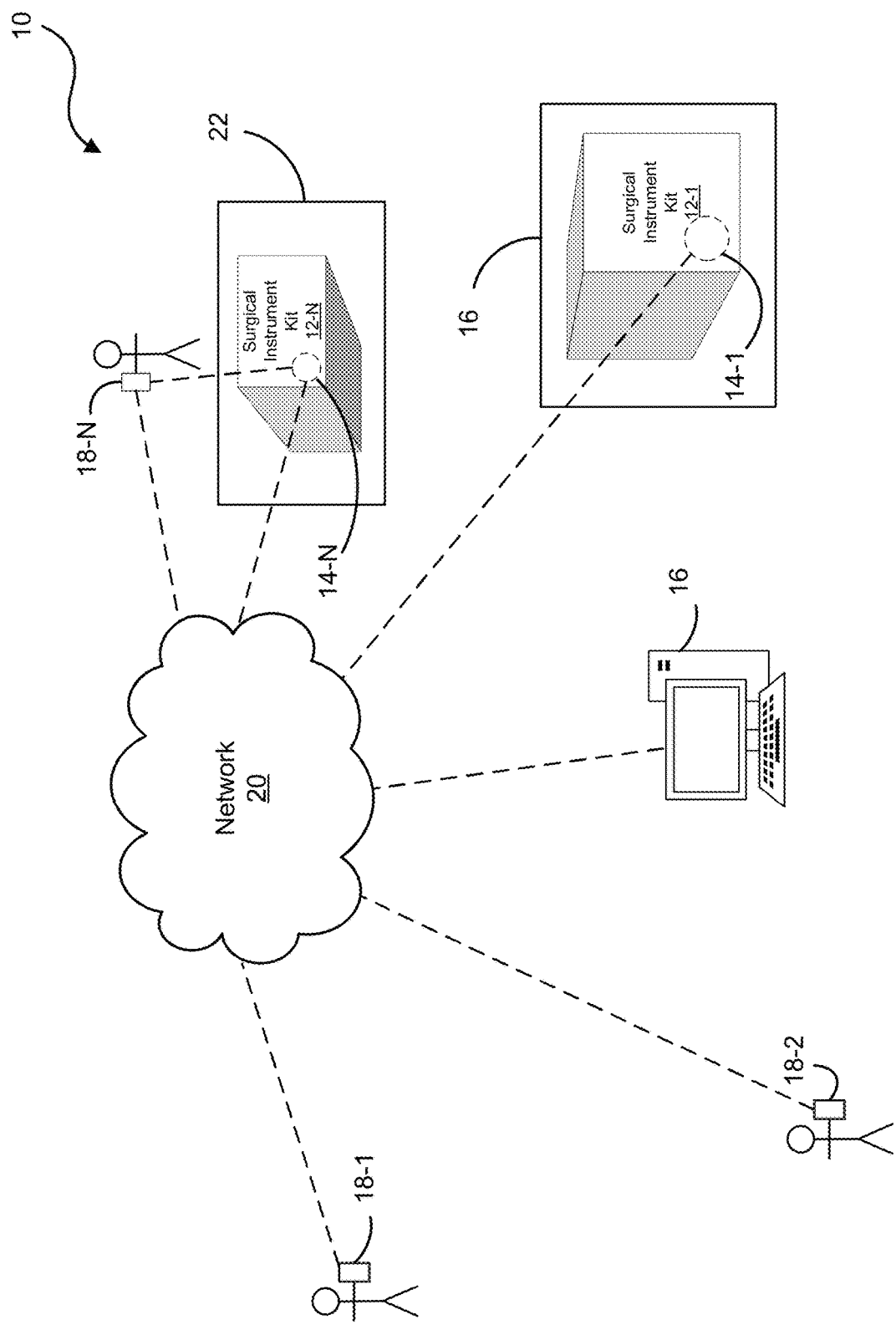
FIG. 1 is a block diagram of an exemplary system for tracking surgical instrument kits.

FIG. 1 is a block diagram of an exemplary system 10 for tracking surgical instrument kits 12 (wherein the reference "N" represents an integer greater than "1" and not necessarily equal to any other "N" reference herein). In this embodiment, BTLE modules 14-1-14-N are respectively configured with the surgical instrument kits 12-1-12-N. The BTLE modules 14 each comprise a BTLE tracking device that is operable to transmit a signal that identifies the BTLE module 14 as well as its geolocation. The BTLE modules 14 are configured in a housing that is waterproof and configured from a material that is capable of withstanding temperatures in excess of 250° F. Thus, when a surgical instrument kit 12-1 is placed in an autoclave 16, the BTLE module 14-1 is capable of operation when the surgical instrument kit 12-1 is being sterilize by the autoclave 16. In some embodiments, the BTLE module 14-1 is configured with a temperature sensor that is operable to determine the temperature of the surgical instrument kit 12-1 so as to provide reassurance that the surgical instrument kit 12 has reached a proper temperature for sterilization of the surgical instruments therein.

Once sterilized, a technician or other medical facility personnel removes the surgical instrument kits 12-1 from the autoclave 16 and transfers it to a location where it is needed (e.g., an operating room) or places it in storage 22 (e.g., a shelf, a surgical instrument storage facility, etc.) for subsequent use.

As mentioned, the surgical instrument kits 12 are often handled and tracked by hand which is prone to human error. The BTLE modules 14 are able to continually transmit the identifications (IDs) of their respective surgical instrument kits 12 (e.g., like a heartbeat monitor). Thus, when a user with a handheld computing device 18 (e.g., a smart phone, tablet computer, etc. configured with geolocation and identification software), passes within a predetermined proximity of the surgical instrument kit 12, the user's handheld computing device 18 can receive the BTLE module 14 signal identifying the surgical instrument kit 12 and then determine its location (e.g., via GPS, cell phone triangulation, or other location service). This can occur when the user is actively searching for the surgical instrument kit 12 or when the user is simply within proximity of the BTLE signal. The user's handheld computing device 18 may then be configured to automatically transfer the ID and geolocation of the surgical instrument kit 12 to a secure network 20 (e.g., via Wi-Fi, cellular data, etc.) for processing by a computing system 16. Generally, only personnel authorized to handle the surgical instruments kits are granted access the secure network 20, which may include encryption techniques (e.g., via hashing algorithms, Advanced Encryption Standard, or "AES", etc.)

Once received by the computing system 16, the computing system 16 may update the location of the surgical instrument kit 12 in an associated database. For example, the database may contain a series of data structures (e.g., one for each surgical instrument kit 12) with the ID of each surgical instrument kit 12. Once the computing system 16 receives the information from the user's handheld computing device 18, the computing system 16 updates the data structure with the geolocation of the surgical instrument kit 12 and possibly the last time that the BTLE module 14's signal was last detected by the handheld computing device 18.

To illustrate, assume that the surgical instrument kit 12-N has been removed from the autoclave 16 and placed in storage 22. Then, when the user of the handheld computing device 18-N passes within the vicinity of the surgical instrument kit 12-N, the user's handheld computing device 18-N automatically detects the ID of the surgical instrument kit 12-N. Once the BTLE module 14's signal is detected, the handheld computing device 18-N automatically determines the ID of the surgical instrument kit 12-N and then automatically determines the geolocation of the handheld computing device 18-N and the time the signal was detected.

Once the geolocation of the handheld computing device 18-N and the ID of the surgical instrument kit 12-N has been obtained, the handheld computing device 18-N transfers this information to the network 20 for processing by the computing system 16. The computing system 16 updates the location of the surgical instrument kit 12-N in the database. The computing system 16 may then generate and transmit an alert to a user responsible for the surgical instrument kit 12-N. For example, just as each surgical instrument kit 12 has an identification in its associated data structure in the database, its associated data structure may include one or more users that are responsible for the surgical instrument kit 12-N (e.g., the users of the handheld computing devices 18-1 and/or 18-2). Thus, when the computing system 16 processes the information from the handheld computing device 18-N, the computing system 16 may transmit an alert to the handheld computing devices 18-1 and/or 18-2 informing those computing devices of the location of the surgical instrument kit 12-N. Alternatively or additionally, the users of the handheld computing devices 18-1 and/or 18-2 may access the database for the network 20 to identify the locations of their respective surgical instrument kits 12.

Figure 2:
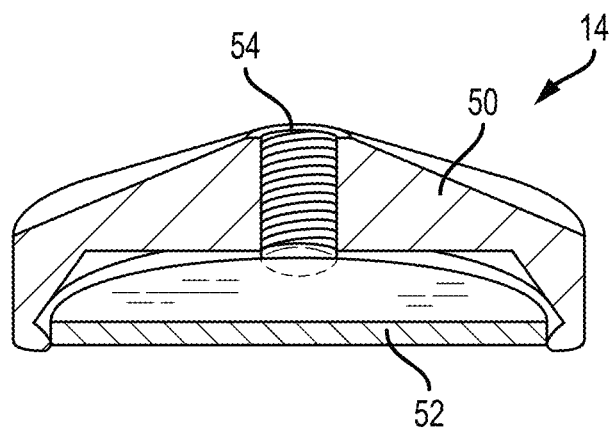
FIG. 2 is a cutaway view of an exemplary housing for a BTLE module.

FIG. 2 is a cutaway view of an exemplary housing for a BTLE module 14. In this embodiment, the housing is configured of two separate thermally insulating plastics in a clamshell configuration with a first portion 50 of the clamshell configuration snapping onto a second portion 52 of the clamshell configuration. This clamshell configuration is waterproof and airtight. And in this clamshell configuration is a recessed area for retaining a BTLE device. In some embodiments, the first portion 50 and the second portions 52 of the clamshell configuration are compressed together in a vacuum (or in a thermally resistant gas such as a dielectric gas) with the BTLE device in the recessed area so as to provide additional thermal resistance during autoclave procedures.

Figure 3:
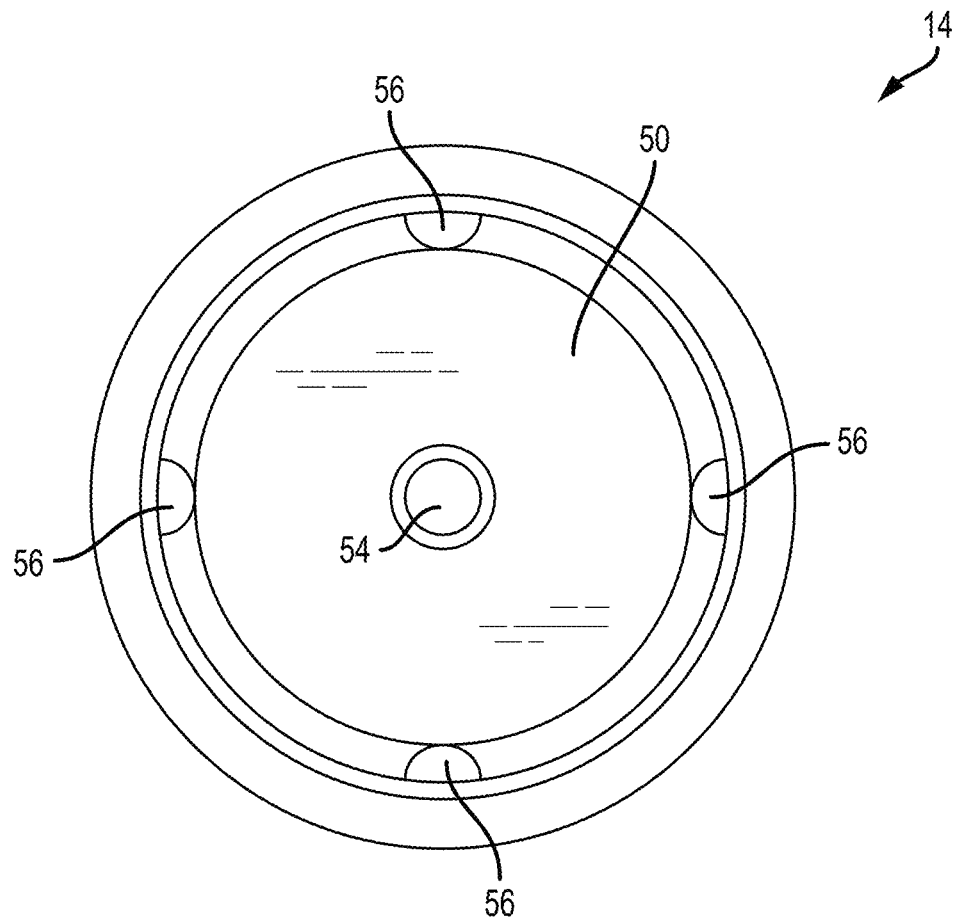
FIG. 3 is an overhead view of the exemplary housing for a BTLE module of FIG. 2.

FIG. 3 is an overhead view of the exemplary housing for a BTLE module of FIG. 2. In this embodiment, the first portion 50 of the clamshell configuration comprises a threaded receiver 54 and nodes 56 such that the first portion 50 of the clamshell configuration can be separated from the second portion 52 when the BTLE device inside requires service (e.g., battery replacement). An example of such is shown in FIG. 4.

Figure 4:
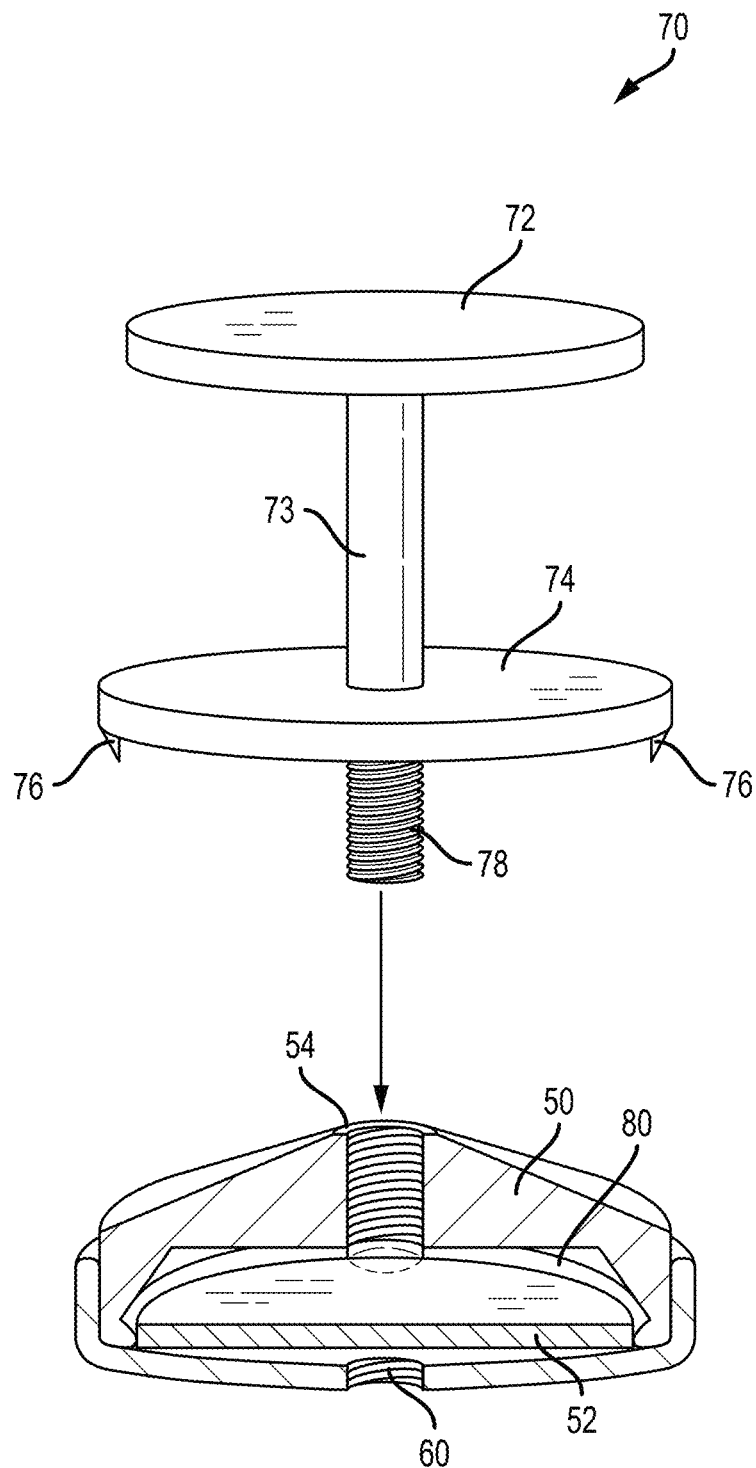
FIG. 4 is a block diagram of a gantry service pull for separating the housing, in one exemplary embodiment.
Figure 5:
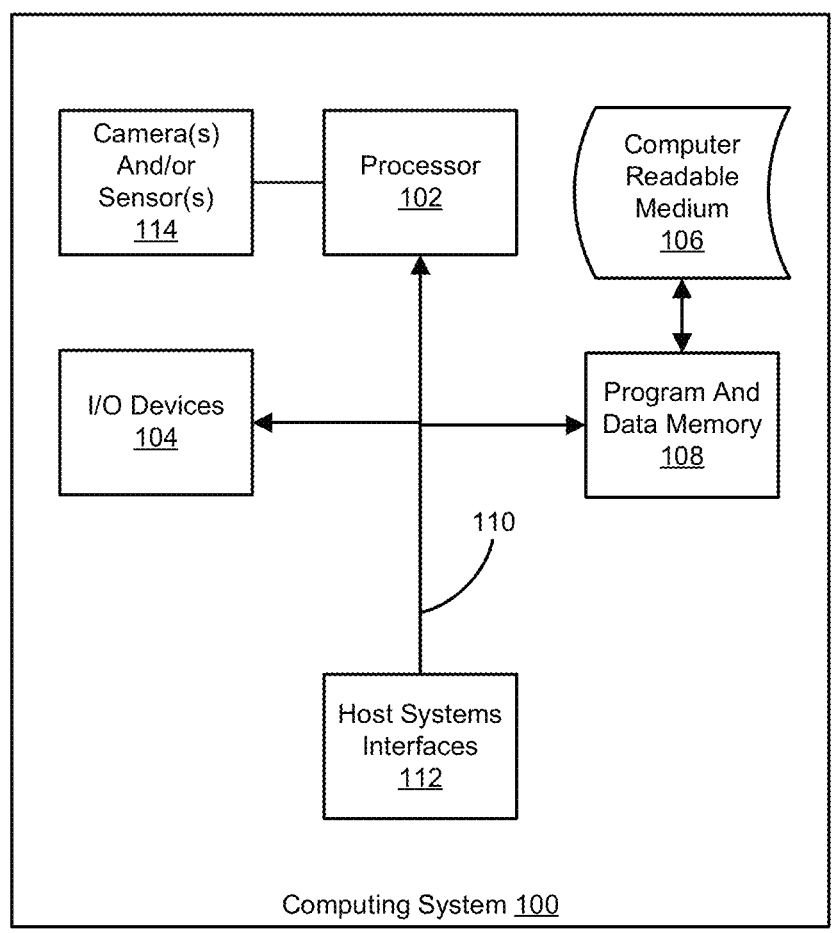
FIG. 5 is a block diagram of an illustrative computer system architecture according to aspects of the present disclosure.

FIG. 4 is a block diagram of a gantry service pull for separating the housing, in one exemplary embodiment. In this embodiment, the gantry service pull 70 comprises a handle 72 for turning a shaft 73. At one end of the shaft 73 is a threaded portion 78 that is matched threaded to the receiver 54 of the first portion 50 of the clamshell configuration. The gantry service pull is configured with an extraction plate 74 comprising pins 76 that lock into the nodes 56 of the first portion 50 of the clamshell configuration. Thus, when shaft 73 of the gantry service pull 70 is turned by the handle 72, the threaded portion 78 of the gantry service pull 70 screws into the first portion 50 of the clamshell configuration. When enough pressure is exerted by the turns of the gantry service pull 70, the first portion 50 of the clamshell configuration is separated from the second portion 52 of the clamshell configuration.

In some embodiments, the second portion 52 of the clamshell configuration comprises a securing mechanism 60. For example, the housing 14 may be secured to the surgical instrument kit 12 via a rivet to or from the securing mechanism 60.

Any of the above embodiments herein may be rearranged and/or combined with other embodiments. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 4 illustrates a computing system 100 in which a computer readable medium 106 may provide instructions for performing any of the methods disclosed herein.

Furthermore, the embodiments can take the form of a computer program product accessible from the computer readable medium 106 providing program code for use by or in connection with a computer or any instruction execution system. For the purposes of this description, the computer readable medium 106 can be any apparatus that can tangibly store the program for use by or in connection with the instruction execution system, apparatus, or device, including the computer system 100.

The medium 106 can be any tangible electronic, magnetic, optical, electromagnetic, infrared, or semiconductor system (or apparatus or device). Examples of a computer readable medium 106 include a semiconductor or solid state memory, magnetic tape, a removable computer diskette, a random access memory (RAM), NAND flash memory, a read-only memory (ROM), a rigid magnetic disk and an optical disk. Some examples of optical disks include compact disk-read only memory (CD-ROM), compact disk-read/write (CD-R/W) and digital versatile disc (DVD).

The computing system 100, suitable for storing and/or executing program code, can include one or more processors 102 coupled directly or indirectly to memory 108 through a system bus 110. The memory 108 can include local memory employed during actual execution of the program code, bulk storage, and cache memories which provide temporary storage of at least some program code in order to reduce the number of times code is retrieved from bulk storage during execution. Input/output or I/O devices 104 (including but not limited to keyboards, displays, pointing devices, etc.) can be coupled to the system either directly or through intervening I/O controllers. Network adapters may also be coupled to the system to enable the computing system 100 to become coupled to other data processing systems, such as through host systems interfaces 112, or remote printers or storage devices through intervening private or public networks. Modems, cable modem and Ethernet cards are just a few of the currently available types of network adapters.

What is claimed is:

1. A system, comprising:
   a gantry pull mechanism;
   a surgical instrument kit operable to retain a plurality of surgical instruments for sterilization in an autoclave;
   a wireless low energy transfer (WLET) device operable to transmit a signal for locating and identifying the surgical instrument kit;
   a battery operable to provide power to the WLET device;
   a housing operable to retain the WLET device and the battery, the housing comprising a first part and a second part, each being configured from a thermally insulating plastic that is operable to withstand temperatures in excess of 250 degrees Fahrenheit,
   wherein the first part of the housing comprises a recessed area in which the WLTE device is positioned;
   wherein the second part of the housing is operable to mate with the first part of the housing via a compression means that seals the WLET device within the housing and waterproofs the WLET device;
   wherein the housing is secured to the surgical instrument kit via the first part of the housing; and
   wherein the second part of the housing comprises a threaded receiver for receiving the gantry pull mechanism to allow the second part of the housing to be separated from the first part of the housing when the battery requires replacement;
   a handheld computing device operable to detect the signal from the WLET device when the handheld computing device is within a predetermined proximity of the surgical instrument kit, to determine a geolocation and an identification of the WLET device, and to transmit the geolocation and the identification of the WLET device to a secure network; and
   a computing system communicatively coupled to the secure network and operable to process the geolocation and the identification of the WLET device, to identify a user responsible for the surgical instrument kit based on the processed identification of the WLET device, and to alert the user of the geolocation of the surgical instrument kit based on the processed geolocation of the WLET device.

2. The system of claim 1, further comprising:
   a dielectric gas in the recessed area for providing thermal insulation to the WLET device.

* * * * *